United States Patent
Xie et al.

(10) Patent No.: US 9,252,824 B1
(45) Date of Patent: Feb. 2, 2016

(54) METHOD AND APPARATUS FOR FILTERING NOISE IN A SIGNAL RECEIVED BY A WIRELESS RECEIVER

(71) Applicant: Marvell International Ltd., Hamilton (BM)

(72) Inventors: Jin Xie, Longmont, CO (US); Kapil Jain, Santa Clara, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/556,287

(22) Filed: Dec. 1, 2014

Related U.S. Application Data

(60) Provisional application No. 61/911,278, filed on Dec. 3, 2013.

(51) Int. Cl.
| | |
|---|---|
| *H04B 15/02* | (2006.01) |
| *G10L 21/0224* | (2013.01) |
| *H04B 1/12* | (2006.01) |
| *H04L 27/22* | (2006.01) |
| *H04L 27/06* | (2006.01) |
| *G10K 11/16* | (2006.01) |
| *G10L 21/0216* | (2013.01) |

(52) U.S. Cl.
CPC ........... *H04B 1/12* (2013.01); *H04L 27/06* (2013.01); *H04L 27/22* (2013.01); *G10L 2021/02165* (2013.01)

(58) Field of Classification Search
CPC .............. G10L 21/0208; G10L 2021/02165; G10L 21/0216; G10L 21/0316; H04R 3/005; H04R 1/1083; H04R 1/406; H04R 2410/07; H04R 2430/25; H04R 2430/20; H04R 25/407; H04R 2499/11; G10K 11/178; G10K 2210/3022; G10K 2210/30391
See application file for complete search history.

(56) References Cited

U.S. PATENT DOCUMENTS

| | | | |
|---|---|---|---|
| 3,783,410 A * | 1/1974 | Bruck ........................... 332/109 |
| 2013/0332156 A1* | 12/2013 | Tackin et al. .................. 704/226 |
| 2014/0286497 A1* | 9/2014 | Thyssen et al. ................. 381/66 |

OTHER PUBLICATIONS

Yuzhuo Fang; Zhiyong Xu; Hong Gu, "Adaptive algorithm for time delay estimation in the indoor reverberant environment," Audio, Language and Image Processing (ICALIP), 2012 International Conference on , pp. 266, 269, Jul. 16-18, 2012.*

* cited by examiner

*Primary Examiner* — Chieh M Fan
*Assistant Examiner* — Michelle M Koeth

(57) ABSTRACT

Systems and methods are provided for performing noise filtering of a received signal. A first signal is received via a first receiver. A second signal is received via a second receiver. A combined signal based on the first and second signals is generated. The combined signal is processed to generate an adjusted combined signal. A phase adjustment is performed on the adjusted combined signal based on amplitude values of the adjusted combined signal during a period of time and an amplitude value of the first signal during the period of time. The phase-adjusted signal is subtracted from the first signal to generate a noise reference signal. The noise reference signal is subtracted from the combined signal to generate a filtered output signal.

13 Claims, 13 Drawing Sheets

METHOD AND APPARATUS FOR FILTERING NOISE IN A SIGNAL RECEIVED BY A WIRELESS RECEIVER

CROSS-REFERENCE TO RELATED APPLICATIONS

This disclosure claims priority to U.S. Provisional Patent Application No. 61/911,278, filed on Dec. 3, 2013, which is incorporated herein by reference in its entirety.

FIELD

This disclosure is related generally to wireless signal processing and more particularly to filtering noise in a signal received by a wireless receiver.

BACKGROUND

Wireless communication channels often introduce some level of noise to a signal being transmitted. Such noise can reduce the achievable bandwidth of the communication channel or may corrupt the transmitted signal so much that the transmitted signal cannot be understood at the receiver. Noise filtering can be performed at the receiver in an attempt to restore signal quality such that the transmitted signal can be extracted and outputted by the receiver.

SUMMARY

Systems and methods are provided for performing noise filtering of a received signal. An example system for performing noise filtering of a received signal includes a first receiver configured to capture a first signal and a second receiver configured to capture a second signal. Each of the first and second signals includes a desired signal portion and a noise portion, where the desired signal portions are received at the first receiver and the second receiver substantially simultaneously, and the noise portions are received at the first receiver and the second receiver at different times. The system further includes a signal processor configured to generate a combined signal based on the first signal and the second signal and process the combined signal to generate an adjusted combined signal. The signal processor is also configured to perform a phase adjustment on the adjusted combined signal based on (i) amplitude values of the adjusted combined signal during a period of time, and (ii) an amplitude value of the first signal during the period of time. The signal processor is also configured to subtract the phase-adjusted signal from the first signal to generate a noise reference signal. The noise reference signal is a representation of the noise portion of the first signal. The noise reference signal is subtracted from the combined signal to generate a filtered output signal that is substantially similar to the desired signal portions of the first and second signals.

As another example, in a method for performing noise filtering of a received signal, a first signal is received via a first receiver. A second signal is received via a second receiver. Each of the first and second signals includes a desired signal portion and a noise portion, where the desired signal portions are received at the first receiver and the second receiver substantially simultaneously, and the noise portions are received at the first receiver and the second receiver at different times. A combined signal based on the first signal and the second signal is generated. The combined signal is processed to generate an adjusted combined signal. A phase adjustment is performed on the adjusted combined signal based on (i) amplitude values of the adjusted combined signal during a period of time, and (ii) an amplitude value of the first signal during the period of time. The phase-adjusted signal is subtracted from the first signal to generate a noise reference signal. The noise reference signal is a representation of the noise portion of the first signal. The noise reference signal is subtracted from the combined signal to generate a filtered output signal that is substantially similar to the desired signal portions of the first and second signals.

As a further example, a system for performing noise filtering of a received signal includes a first receiver configured to capture a first signal and a second receiver configured to capture a second signal. Each of the first and second signals includes a desired signal portion and a noise portion, where the desired signal portions are received at the first receiver and the second receiver substantially simultaneously, and the noise portions are received at the first receiver and the second receiver at different times. The system includes an adder configured to combine the first signal and the second signal to form a combined signal and a phase shifter configured to process the combined signal to generate an adjusted combined signal. The system also includes a phase feedback loop configured to perform a phase adjustment to the adjusted combined signal based on (i) amplitude values of the adjusted combined signal during a period of time, and (ii) an amplitude value of the first signal during the period of time. The system further includes a subtractor configured to subtract the phase-adjusted signal from the first signal to generate a noise reference signal that is subtracted from the combined signal to generate a filtered output signal. The noise reference signal is a representation of the noise portion of the first signal, and the filtered output signal is substantially similar to the desired signal portions of the first and second signals. The phase adjustment is continually regulated based on amplitude values of the adjusted combined signal and the first signal.

DETAILED DESCRIPTION

Figure 1:
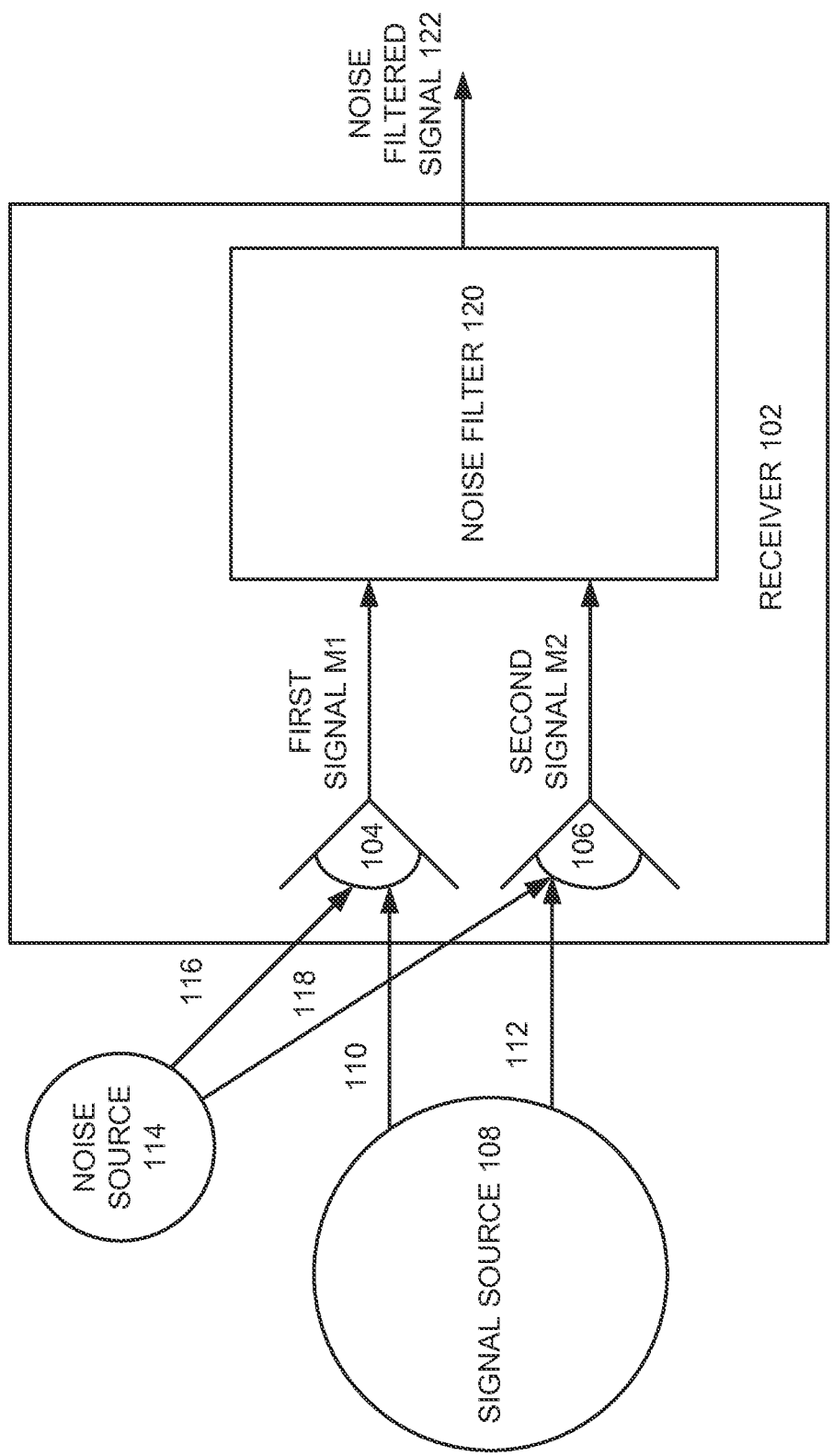
FIG. 1 is a diagram depicting a system for performing noise filtering of a received signal that utilizes two antennas.

FIG. 1 is a diagram depicting a system for performing spatial filtering of a received signal that utilizes two antennas. A receiver 102 includes a plurality of antennas 104, 106 configured to wirelessly receive a signal from a signal source 108. For example, when the receiver 102 is configured to receive audio signals, the two antennas 104, 106 can be implemented using microphones. The antennas 104, 106 are positioned orthogonally to a direction from which an incoming signal 110, 112 from the signal source 108 is expected to be received. Because the antennas 104, 106 are positioned orthogonally to the expected direction of travel of the incoming signal 110, 112, the incoming signal 110, 112 is received by the antennas 104, 106, respectively, at nearly the same time.

A communication channel through which the incoming signal 110, 112 is transmitted will often introduce a noise component from a noise source 114. For example, when the receiver 102 is implemented in an audio context (e.g., as part of a cell phone microphone component), ambient noise from the noise source 114 is picked up by the microphones 104, 106. Because the noise source 114 is coming from a direction that is not orthogonal to the positioning of the antennas 104, 106, the antennas will receive the noise reference signal 116, 118 at different times. In the example of FIG. 1, the first antenna 104 receives the noise reference signal 116 before the second antenna 106 receives the noise reference signal 118 due to the longer distance between the noise source 114 and those respective antennas.

A noise filter 120 is configured to utilize the time differentiation of the receipt of the noise reference signals 116, 118 to generate a noise filtered signal 122 that is as close as possible to the transmitted signal 110, 112 based on a first signal M1 provided by the first antenna 104 and a second signal M2 provided by the second antenna 106. The use of the noise filter 120 in this manner may be known as beamforming. Beamforming is a technique used to achieve spatial selectivity when receiving a signal by more than one receiver. The received signal can be an audio signal, an electromagnetic signal, or a signal of another type.

Figure 2:
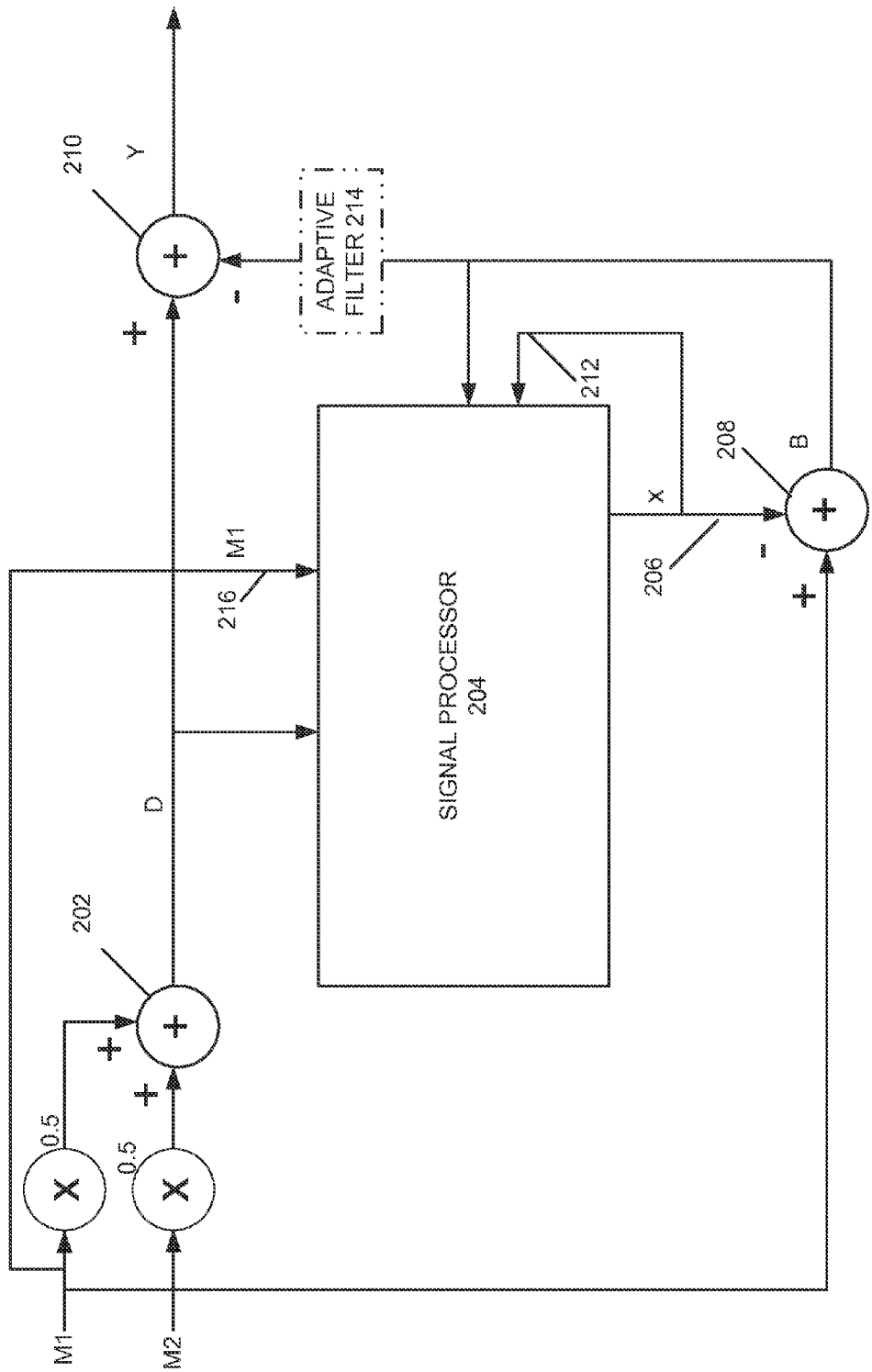
FIG. 2 is a block diagram depicting a system for performing noise filtering of a received signal.

FIG. 2 is a block diagram depicting a system for performing noise filtering of a received signal. A first antenna captures a first signal, and the first signal is illustrated in FIG. 2 as M1. A second antenna captures a second signal, and the second signal is illustrated in FIG. 2 as M2. Each of the first signal M1 and the second signal M2 has a desired signal component and a noise component. With reference to the example of FIG. 1, the signal source 108 is positioned such that the direction of travel of the desired signal 110, 112 is orthogonal to the positions of the antennas 104, 106. Thus, the desired signal 110, 112 is received by the first antenna 104 and the second antenna 106 almost simultaneously. In contrast, the noise source 114 is positioned at a different angle with respect to the antennas 104, 106 than the signal source 108. Consequently, the noise reference signal 116, 118 is received at different times by the antennas 104, 106 due to the differing distances travelled. Thus:

$$M1 = s + n;\text{ and}$$

$$M2 = (s \text{ delayed by } \delta s) + (n \text{ delayed by } \delta n), \quad \text{(Equation 1)}$$

where s is the desired signal, n is the noise, δs is the delay in receipt of the desired signal between the first antenna 104 and the second antenna 106, δn is the delay in receipt of the noise between the first antenna 104 and the second antenna 106, where δn will tend to be greater than δs because the noise is coming from a direction other than the expected direction from which the desired signal is received, and the amplitude of s is on average larger than the amplitude of n.

The system of FIG. 2 utilizes the differing times of arrival of the desired signal and the noise at the antennas to filter the noise from the received first signal M1 and second signal M2 to output a filtered signal Y. At 202, the first signal M1 and the second signal M2 are combined, such as via an averaging operation, where prior to the combining, each of M1 and M2 are multiplied by 0.5, to form a combined signal D. When M1 and M2 are averaged to form D, D can be represented as:

$$D = (s \text{ delayed by } \delta s/2) + (n \text{ delayed by } \delta n/2). \quad \text{(Equation 2)}$$

A signal processor 204 receives the combined signal D and processes that signal to generate an adjusted combined signal x that is outputted at 206. As described in further detail below, x is a phase-adjusted and gain-adjusted version of D. Further, the adjusted combined signal x that is output at 206 is a representation of the desired signal received from the signal source. At 208, the signal x is subtracted from the first signal M1 from the first antenna to generate a signal B that is representative of the noise received from the noise source. That noise reference signal B is subtracted from the combined signal D at 210 to generate a noise-reduced output signal Y. In one embodiment, the noise signal B is provided to an adaptive filter 214 for processing prior to being subtracted from the combined signal D at 210. The noise reference signal B is also provided to the signal processor 204. As explained in further detail below, the noise reference signal B and the combined signal D are used by the signal processor 204 to generate a gain error that is used in adjusting a gain of the combined signal D.

As noted above, the first signal M1 processed at 208 is composed of s+n, and the combined signal D, without adjustment by the signal processor 204, is composed of (s delayed by δs/2)+(n delayed by δn/2). Because the desired signal portions of the first signal M1 and the combined signal D are initially out of phase, a first subtraction operation at 208 (i.e., M1−x) will likely not result in an accurate noise reference signal B that does not include components of the desired signal s. Thus, the signal processor 204 is configured to perform a phase adjustment on the adjusted combined signal x based upon (i) feedback 212 from the adjusted combined signal x that is output at 206, and (ii) the first signal M1 that is received by the signal processor 204 at 216. Specifically, the signal processor 204 is configured to perform the phase adjustment on the adjusted combined signal x based on a plurality of amplitude values of the adjusted combined signal x during a period of time and an amplitude value of the first signal M1 during the period of time. The phase adjustment is used to align the first signal M1 and the adjusted combined signal x. By aligning M1 and x, the noise reference signal B (which is equal to M1−x) includes components of the noise signal n and does not include components of the desired signal s.

Figure 3:
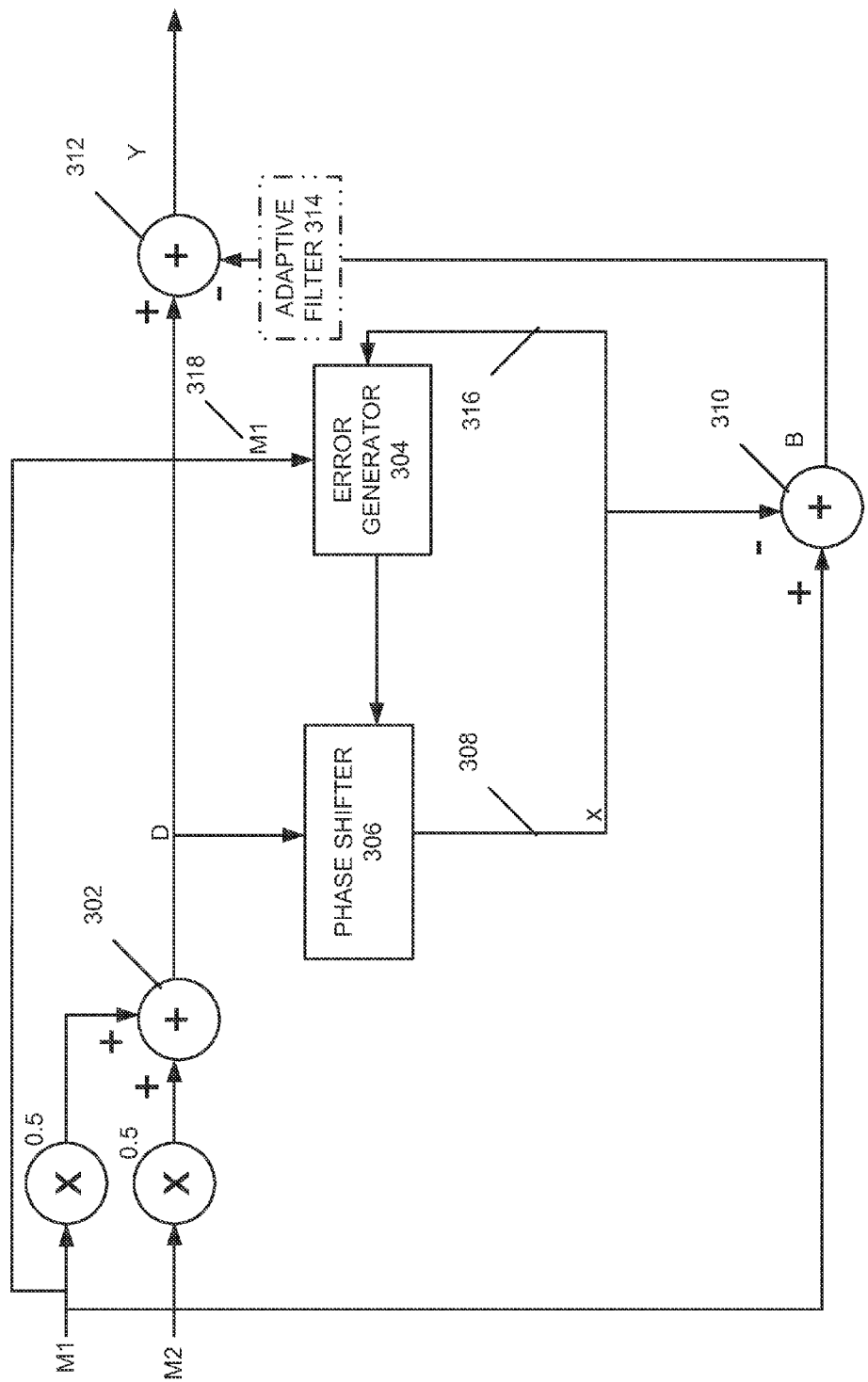
FIG. 3 is a block diagram depicting a signal processor performing a phase adjustment on a combined signal.

FIG. 3 is a block diagram depicting a signal processor performing a phase adjustment on a combined signal. A first antenna captures a first signal, and the first signal is illustrated in FIG. 3 as M1. A second antenna captures a second signal, and the second signal is illustrated in FIG. 3 as M2. At 302, the first signal M1 and the second signal M2 are combined to form a combined signal D. The combined signal D is provided to a phase shifter 306. The phase shifter 306 processes the combined signal D to generate an adjusted combined signal x 308. The adjusted combined signal x 308 is subtracted from the first signal M1 at 310 to generate a noise reference signal B. The noise reference signal B is filtered by adaptive filter 314 and then is subtracted from the combined signal D at 312 to generate a filtered output signal Y.

Feedback 316 from the adjusted combined signal x 308 is provided to an error generator 304. The error generator 304 also receives the first signal M1, as illustrated at 318. The error generator 304 instructs the phase shifter 306 to adjust the phase of the adjusted combined signal x 308, thus causing a signal portion of the adjusted combined signal x 308 to match the signal portion of the first signal M1. The signal processor of FIG. 3 thus includes a phase loop configured to align M1 and x. As described in greater detail below, the error generator 304 instructs the phase shifter 306 to adjust the phase of the adjusted combined signal x 308 based on (i) amplitude values of the adjusted combined signal x during a period of time, and (ii) an amplitude value of the first signal M1 during the period of time.

If components of the desired signal (i.e., the desired signal s) remain in the noise reference signal B, this is undesirable. Specifically, if the components of the desired signal remain in the noise reference signal B, then the subtraction operation performed at 312 may cause components of the desired signal to be subtracted from the combined signal D and not included in the filtered output signal Y. The signal processor of FIG. 3 includes a phase loop, and when this phase loop settles, the signals x and M1 are well-aligned, thus causing the noise reference signal B to contain n only and not contain s.

Figure 4:
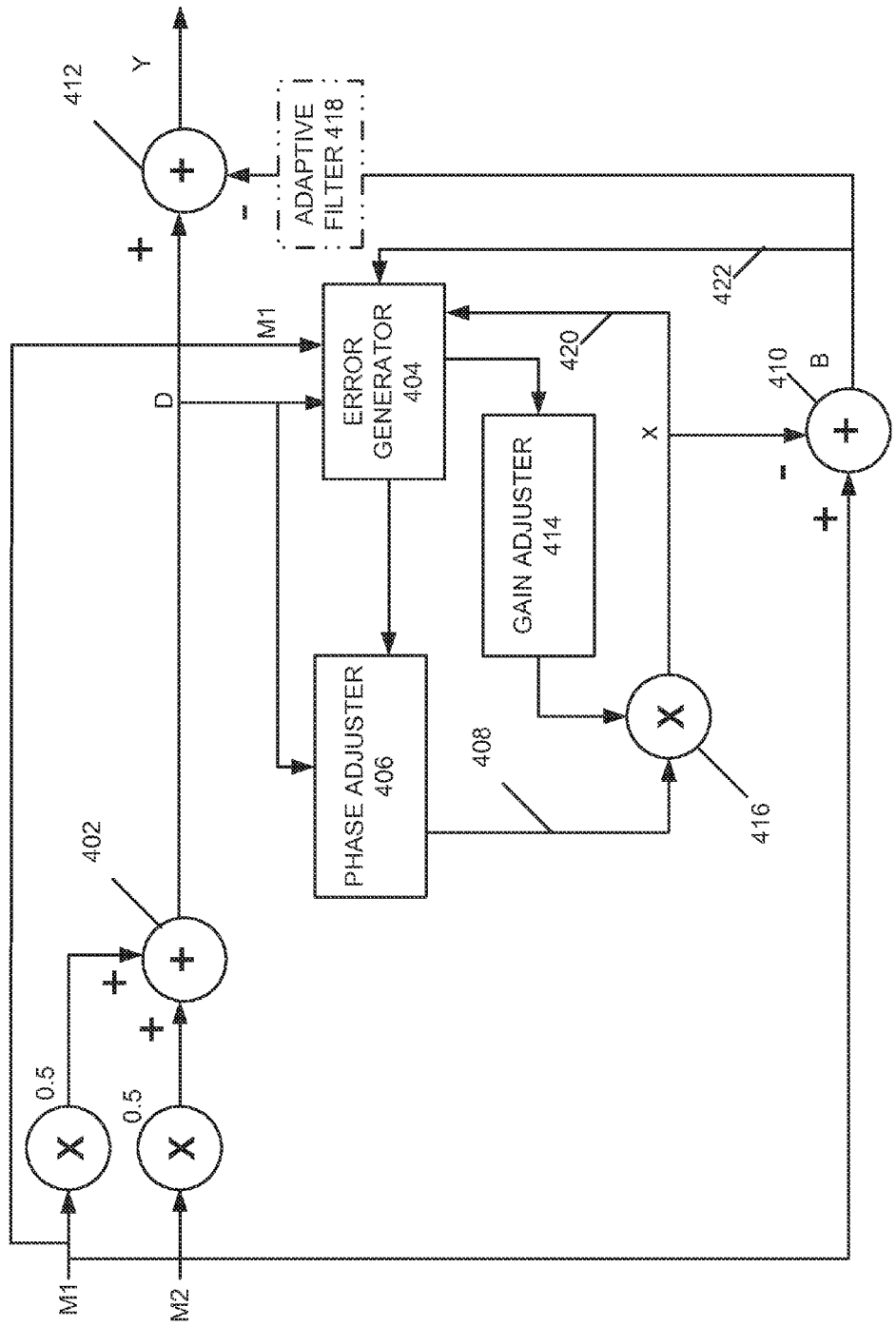
FIG. 4 is a block diagram depicting a signal processor performing a phase adjustment and a gain adjustment on a combined signal.

FIG. 4 is a block diagram depicting a signal processor performing a phase adjustment and a gain adjustment on a combined signal. It is possible in some implementations that the level of the signal portion of the first signal M1 and the combined signal D may differ. For example, differences in the first antenna and second antenna (e.g., antennas 104, 106 in FIG. 1), could result in the combined signal D (e.g., the average of M1 and M2) having a different signal level component than the first signal M1 alone. This may be due to, for example, minor hardware differences, such as microphone construction, among other reasons. Thus, the system of FIG. 4 incorporates a gain adjustment to further improve the match between the adjusted combined signal x from the signal processor with the signal portion of the first signal M1 to improve the accuracy of the noise reference signal B.

A first antenna captures a first signal, and the first signal is illustrated in FIG. 4 as M1. A second antenna captures a second signal, and the second signal is illustrated in FIG. 4 as M2. At 402, the first signal M1 and the second signal M2 are averaged to form a combined signal D. The combined signal D is provided to an error generator 404 and a phase shifter 406. The phase shifter 406 performs a phase adjustment on the combined signal D and outputs a phase adjusted signal 408. The phase adjusted signal 408 undergoes a gain adjustment at 416 to generate an adjusted combined signal x. It should thus be appreciated that the adjusted combined signal x described herein is a phase-shifted and gain-adjusted version of D. The adjusted combined signal x is subtracted from the first signal M1 at 410 to generate a noise reference signal B. The noise reference signal B is filtered by adaptive filter 418 and then is subtracted from the combined signal D at 412 to generate a filtered output signal Y.

The adjusted combined signal x is provided to the error generator 404 via feedback 420. The error generator 404 instructs the phase shifter 406 to adjust the phase of the adjusted combined signal x to cause the signals M1 and x to be aligned. To instruct the phase shifter 406, the error generator 404 determines a phase error between the signals M1 and x based on (i) amplitude values of the adjusted combined signal x during a period of time, and (ii) an amplitude value of the first signal M1 during the period of time. The phase error determined by the error generator 404 is provided to the phase adjuster 406 and used in performing a phase adjustment on the signal x to cause the signals M1 and x to be aligned. The error generator 404 also receives the noise reference signal B via feedback 422. Based on the noise reference signal B and the combined signal D, the error generator 404 provides a gain error signal to a gain adjuster 414, and an output from the gain adjuster 414 is used in performing the above-described gain adjustment at 416.

Figure 5:
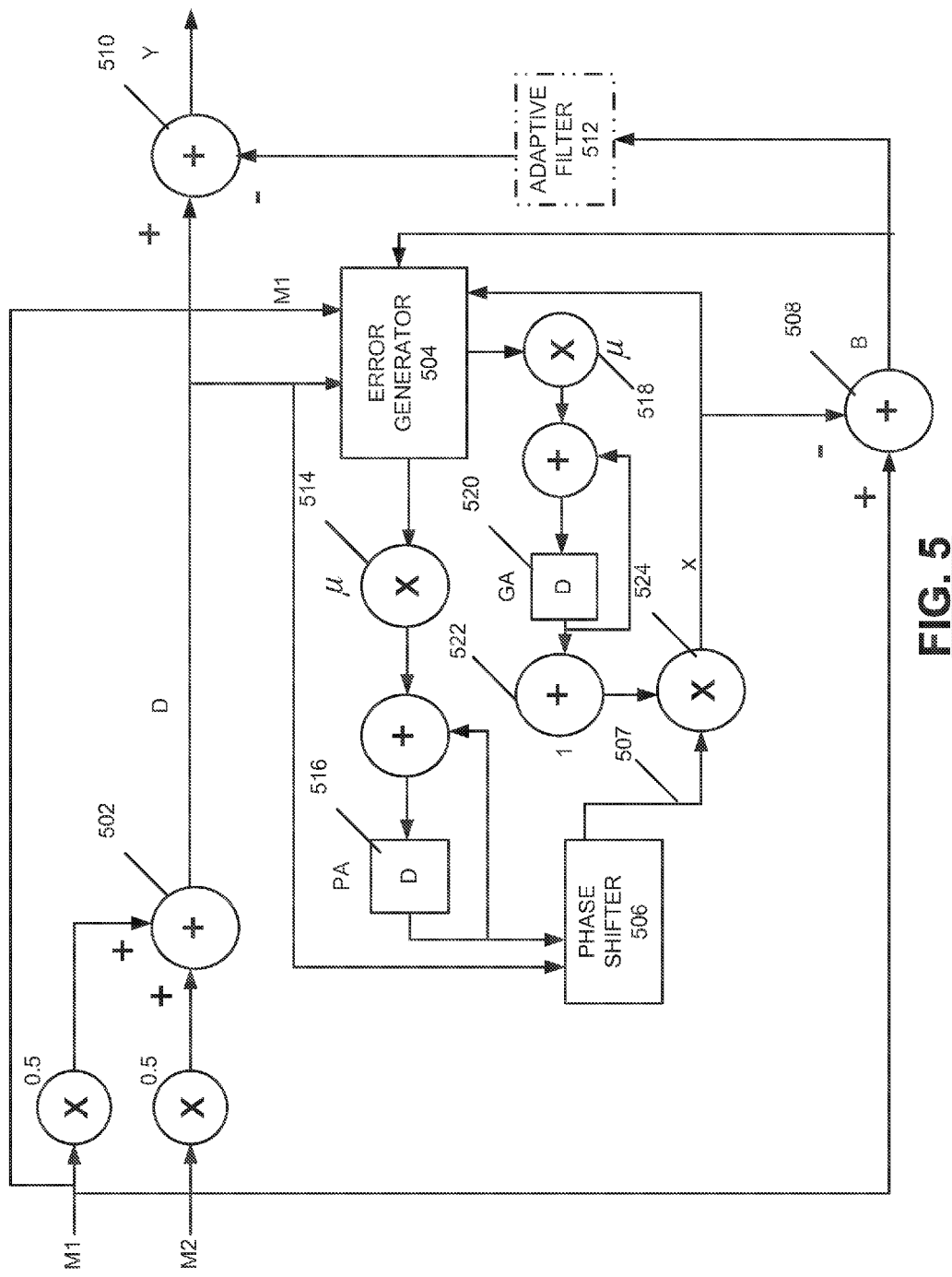
FIG. 5 is a block diagram depicting an example implementation of a system performing noise filtering of a received signal.

FIG. 5 is a block diagram depicting additional details of the phase adjustment and gain adjustment described above with reference to FIG. 4. A first antenna captures a first signal, and the first signal is illustrated in FIG. 5 as M1. A second antenna captures a second signal, and the second signal is illustrated in FIG. 5 as M2. At 502, the first signal M1 and the second signal M2 are averaged to form a combined signal D. The combined signal D is provided to an error generator 504 and to a phase shifter 506. The error generator 504 provides an error signal to downstream phase-shifting circuitry that culminates in the phase shifter 506. The phase shifter 506 performs a phase adjustment on the combined signal D and outputs a phase adjusted signal 507. The phase adjusted signal 507 undergoes a gain adjustment at 524 to generate an adjusted combined signal x. The adjusted combined signal x is subtracted from the first signal M1 at 508 to generate a noise reference signal B. The noise reference signal B is subtracted from the combined signal D at 510 to generate a filtered output signal Y. In one embodiment, the noise reference signal B is processed by a filter 512, such as an adaptive filter, before being subtracted from the combined signal D at 510.

The error generator 504 receives the adjusted combined signal x and the first signal M1. In one embodiment, the error generator 504 is configured to generate the error signal that is output to downstream phase-shifting circuitry based on (i) amplitude values of the adjusted combined signal x during a period of time, and (ii) an amplitude value of the first signal M1 during the period of time. The error signal represents a phase difference between the signals M1 and x and instructs the phase shifting circuitry to adjust the phase of the adjusted combined signal x to match the signal portion of the adjusted combined signal x with the signal portion of the first signal M1. In the implementation of FIG. 5, the error signal from the error generator 504 is multiplied by a step size μ at 514, with the result being provided to a phase accumulator at 516. The phase accumulator is updated according to $$pa' = pa + (\mu * err\_sig), \quad \text{(Equation 3)}$$

where err_sig is the error signal from the error generator 504, pa is the phase accumulator value at the present clock cycle, pa' is the phase accumulator value at the next clock cycle, and μ is the step size. The pa' signal is provided to the phase shifter 506 to command phase adjustment of the adjusted combined signal x. The calculation of the error signal err_sig is described in greater detail below with reference to FIGS. 6A, 6B, 7, and 8.

In addition, the error generator 504 provides a command signal to gain adjusting circuitry to provide a gain adjustment on the phase adjusted signal 507 from the phase shifter 506. In one embodiment, the error generator 504 is configured to output a command signal to the downstream gain adjusting circuitry according to:

$$\text{Error Generator} = D_3 * B, \quad \text{(Equation 4)}$$

where $D_3$ is the combined signal D delayed by three units and B is the noise reference signal that is equal to M1−x. Three units delay are used here to compensate for the delay created in the phase shifter 506. In an example, the phase shifter 506 is a 7-tap FIR filter that creates a delay of 3 units. The error generator 504 instructs the gain adjusting circuitry to adjust the gain of the phase adjusted signal 507 to match the signal portion of the adjusted combined signal x with the signal portion of the first signal M1. In the implementation of FIG. 5, the command signal $D_3 * B$ from the error generator 504 is multiplied by a step size μ at 518, with the result being provided to a gain accumulator at 520. The gain accumulator is updated according to $$ga' = ga + (\mu * D_3 * B), \quad \text{(Equation 5)}$$

where ga is the gain accumulator value at the present clock cycle, ga' is the gain accumulator value at the next clock cycle, μ is the step size, and $D_3 * B$ is the signal provided by the error generator 504. A value of 1 is added to the ga' signal at 522 and that signal is multiplied by the phase adjusted signal 507 from the phase shifter 506 at 524.

Figure 6A:
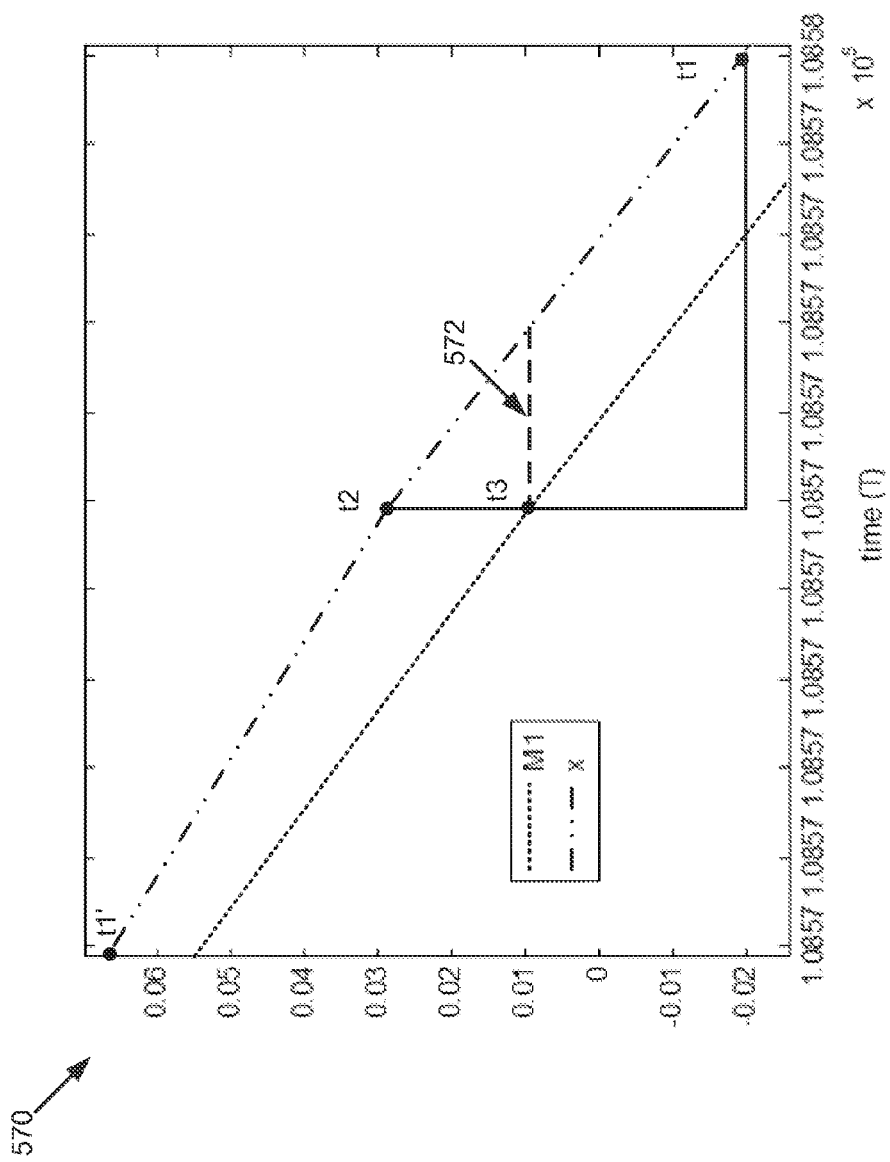
FIGS. 6A and 6B are example graphs depicting amplitude values for signals M1 and x during a period of time.
Figure 6B:
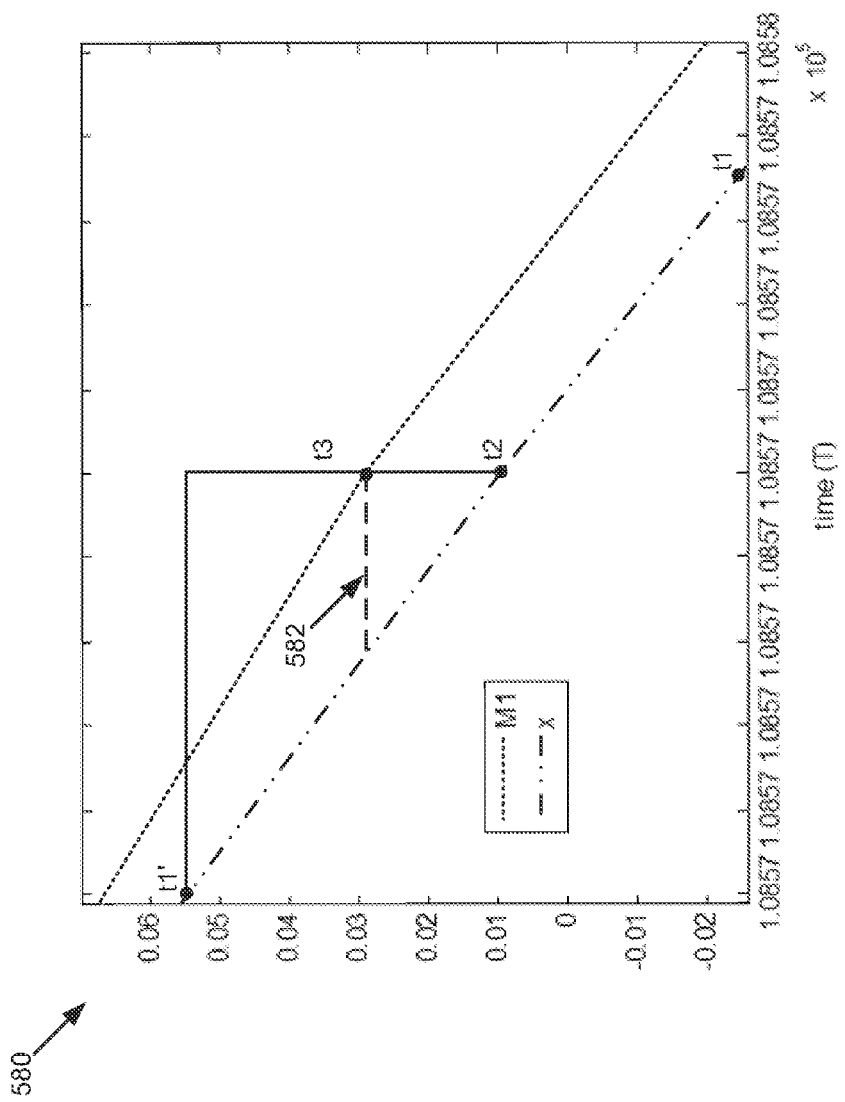

FIGS. 6A and 6B are graphs 570, 580, respectively, depicting amplitude values for signals M1 and x during a period of time. As described above with reference to FIGS. 4 and 5, a system for performing noise filtering of a received signal utilizes a phase loop to align the signals M1 and x. Specifically, an error generator determines a phase error between the signals M1 and x based on (i) amplitude values of the adjusted combined signal x during a period of time, and (ii) an amplitude value of the first signal M1 during the period of time, and the determined phase error is used in performing a phase adjustment on the adjusted combined signal x. FIGS. 6A and 6B are used in illustrating aspects of this phase error determination. As shown below, the phase error determination is not dependent on waveform amplitudes of the desired signal (i.e., the desired signal s) or the noise (i.e., the noise n). Further, as illustrated below, large phase errors can be ignored (e.g., considered to be equal to zero) because such large phase errors reflect the large δn value described above, where δn is the delay in receipt of the noise between first and second antennas (e.g., antennas 104, 106 in FIG. 1).

The graph 570 of FIG. 6A includes an x-axis representing time and a y-axis representing amplitude values for the signals M1 and x. As described above with reference to FIGS. 1-5, M1 is a first signal captured by a first receiver, and x is an adjusted combined signal that is a phase-shifted and gain-adjusted version of the average signal D. Amplitude values for the signals M1 and x illustrated on the graph 570 are used in performing a phase adjustment on the signal x in order to cause the signals M1 and x to be aligned. Specifically, FIG. 6A depicts a first amplitude value t2 of the adjusted combined signal x that occurs at a first time and a second amplitude value t1 of the adjusted combined signal x that occurs at a second time that is after the first time. FIG. 6A further depicts an amplitude value t3 of the first signal M1 that occurs at the first time. The amplitude value t3 of the first signal M1 is within a range of amplitude values defined by the first and second amplitude values t2 and t1 of the adjusted combined signal x (i.e., t1<t3<t2).

A phase error between the signals M1 and x is determined based on the amplitude values t1, t2, and t3 described above. Specifically, these amplitude values t1, t2, and t3 are used to determine a length of the dashed line 572, where the length represents the phase error between the signals M1 and x. The length of the dashed line 572 is a difference between (i) the first time (i.e., the time at which the amplitude values t2 and t3 occur in the signals x and M1, respectively), and (ii) a time at which the adjusted combined signal x has an amplitude value that is equal to the amplitude value t3 of the first signal M1. Using a linear approximation, the length of the dashed line 572 is approximated as $$p\_e1 = (t3 - t2)/(t1 - t2), \quad \text{(Equation 6)}$$

where p_e1 is the approximate length of the dashed line 572, and t3, t2, and t1 are the amplitude values of the signals M1 and x described above.

In addition to the aforementioned amplitude values t1, t2, and t3, the example graph 570 of FIG. 6A also depicts an amplitude value of the adjusted combined signal x. As illustrated in the figure, the amplitude value t1' occurs at a time that is before the first time. Because the first signal M1 leads the adjusted combined signal x in the example of FIG. 6A, the amplitude value t3 of the first signal M1 has an amplitude value that is within the range of amplitude values defined by t2 and t1. In such a situation, the amplitude value t1' is not used in approximating the length of the dashed line 572. By contrast, in a situation where the first signal M1 lags the adjusted combined signal x, the amplitude value t3 is greater than the value t2, and the amplitude value t1' is used in approximating the phase error between the signals M1 and x.

To illustrate the use of the amplitude value t1' in such a situation, FIG. 6B is a graph 580 depicting a first signal M1 that lags an adjusted combined signal x. The graph 580 of FIG. 6B includes an x-axis representing time and a y-axis representing amplitude values for the signals M1 and x. FIG. 6B depicts an amplitude value t1' of the adjusted combined signal x that occurs at a first time, and a second amplitude value t2 of the adjusted combined signal x that occurs at a second time that is after the first time. FIG. 6B further depicts an amplitude value t3 of the first signal M1 that occurs at the second time. The amplitude value t3 of the first signal M1 is within a range of amplitude values defined by the amplitude values t2 and t1' of the adjusted combined signal x (i.e., t2<t3<t1').

A phase error between the signals M1 and x is determined based on the amplitude values t1', t2, and t3. These amplitude values t1', t2, and t3 are used to determine a length of the dashed line 582, where the length represents the phase error between the signals M1 and x. The length of the dashed line 582 is determined using a linear approximation as $$p\_e2 = (t3 - t2)/(t1' - t2), \quad \text{(Equation 7)}$$

where p_e2 is the approximate length of the dashed line 582 and t3, t2, and t1' are the amplitude values of the signals M1 and x described above.

In FIG. 6B, an amplitude value t1 of the adjusted combined signal x occurs at a time that is after the second time. Because the first signal M1 lags the adjusted combined signal x in the example of FIG. 6B, the amplitude value t3 of the first signal M1 has an amplitude value that is within the range of amplitude values defined by t2 and t1', and the amplitude value t1 is not used in calculating the length of the dashed line 582.

In general, when determining the phase error between the first signal M1 and the adjusted combined signal x, it is not known whether M1 tags or leads x. Thus, calculations are made using both of the amplitude values t1 and t1', and a valid phase error is determined on the basis of these calculations. In an example, $$t3 = \text{amplitude of first signal } M1 \text{ at time } k,$$

$$t2 = \text{amplitude of adjusted combined signal } x \text{ at time } k,$$

$$t1 = \text{amplitude of adjusted combined signal } x \text{ at time } k+1, \text{ and}$$

$$t1' = \text{amplitude of adjusted combined signal } x \text{ at time } k-1. \quad \text{(Equation 8)}$$

A first potential phase error value is calculated based on t1, t2, and t3 amplitude values:

$$p = ((t3-t2)/(t1-t2))*T, \quad \text{(Equation 9)}$$

where p is the first potential phase error value and T is the clock cycle of the system (e.g., a clock cycle of the error generator and/or other components of the signal processor). It should be understood that the first potential phase error value p is normalized to the clock cycle T. A second potential phase error value is calculated based on t1', t2, and t3 amplitude values:

$$p' = ((t3-t2)/(t1'-t2))*T. \quad \text{(Equation 10)}$$

To select the valid phase error from the first potential phase error and the second potential phase error, a number of expressions are evaluated. Specifically, if ((t3–t1)*(t3–t2))<0, then t3 is within a range of amplitude values defined by t1 and t2, and p is selected as the valid phase error. If ((t3–t1')*(t3–t2))<0, then t3 is within a range of amplitude values defined by t1' and t2, and p' is selected as the valid phase error. In this scheme, the valid phase error is normalized to the clock cycle T, such that the phase error is always within the range –1 to 1.

Figure 7:
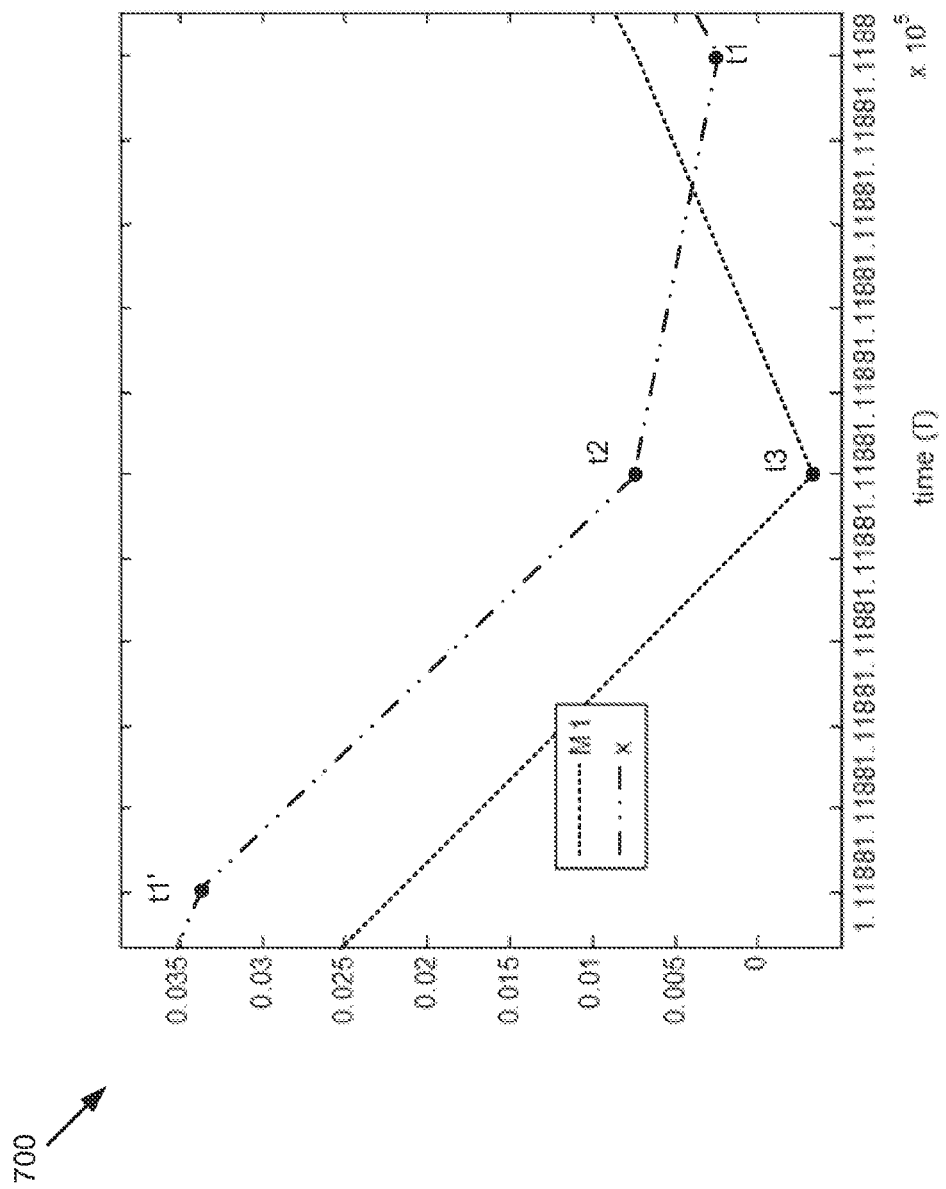
FIG. 7 is example graph showing an amplitude value t3 of a first signal M1 that is outside of a first range of amplitude values defined by amplitude values t1 and t2 of a signal x and outside of a second range of amplitude values defined by amplitude values t1' and t2 of the signal x.

In other examples, an alternate framework is used in determining a valid phase difference between the signals M1 and x. As described below, the alternate framework is used in situations where potential phase error values p and p' are calculated according to Equations 9 and 10 above, but it cannot be determined if p or p' is valid. For example, FIG. 7 is a graph 700 depicting amplitude values for an adjusted combined signal x and a first signal M1. The graph 700 depicts a first amplitude value t1' of the adjusted combined signal x at a first time, a second amplitude value t2 of the adjusted combined signal x at a second time that is after the first time, and a third amplitude value t1 of the adjusted combined signal x at a third time that is after the second time. The adjusted combined signal x forms a peak, as illustrated in FIG. 7. The graph 700 also depicts an amplitude value t3 of the first signal M1 that occurs at the second time. The amplitude value t3 is not within a first range of amplitude values defined by t1 and t2, and t3 is also not within a second range of amplitude values defined by t1' and t2. Because the amplitude value t3 is not within either of the first and second ranges, it cannot be determined if p or p' is valid, and consequently, the phase error is set equal to zero ("0").

Figure 8:
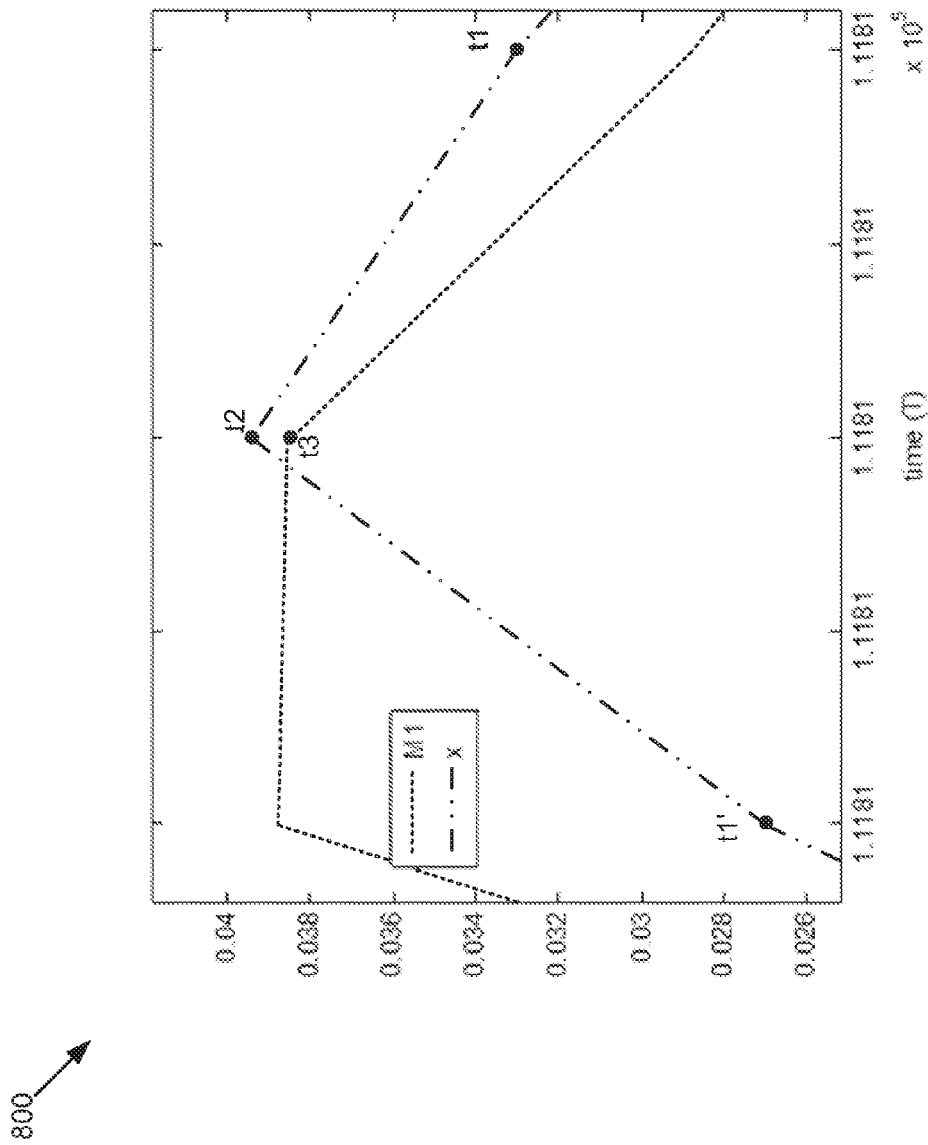
FIG. 8 is an example graph showing an amplitude value t3 of a first signal M1 that is within a first range of amplitude values defined by amplitude values t1 and t2 of a signal x and within a second range of amplitude values defined by amplitude values t1' and t2 of the signal x.

Similarly, FIG. 8 is a graph 800 depicting amplitude values t1, t1', t2, and t3 (as defined above with reference to FIG. 7), where the adjusted combined signal x forms a peak. In the example of FIG. 8, the amplitude value t3 is within the first range of amplitude values defined by t1 and t2, and t3 is also within the second range of amplitude values defined by t1' and t2. Because the amplitude value t3 is within both the first and second ranges, it cannot be determined if p or p' is valid, and consequently, the phase error is set equal to zero ("0"). In another example, because the amplitude value is within both of the first and second ranges, the phase error is set equal to the value of p or p' that has a smaller absolute value.

An example framework for determining a valid phase difference between the signals M1 and x utilizes features of the approaches described above with reference to FIGS. 6A-8. In the example framework, amplitude values t3, t2, t1, and t1' are defined according to Equation 8. If ((t3–t1)*(t3–t2))<0, p is set equal to ((t3–t2)/(t1–t2))*T, according to Equation 9. Otherwise, p is set equal to a value "1.1." Because a valid phase error is always within a range of –1 to 1, the value 1.1 is a flag of invalidity. If ((t3–t1')*(t3–t2))<0, p' is set equal to ((t3–t2)/(t1'–t2))*T, according to Equation 10. Otherwise, p' is set equal to the value 1.1. After setting the values of p and p' according to these conditions, a number of expressions are evaluated to determine the phase error between the signals M1 and x:

If $(p==1.1)$ and $(p'==1.1)$, let phase error=0,

If $(p \neq 1.1)$ and $(p' \neq 1.1)$, let phase error=0,

If $(p==1.1)$ and $(p' \neq 1.1)$, let phase error=p', and

If $(p \neq 1.1)$ and $(p'==1.1)$, let phase error=p. (Equation 11)

Under this framework, the phase error is always within the range of –1 to 1 and is insensitive to waveform amplitudes of the desired signal (i.e., the desired signal s) and the noise (i.e., the noise n). When the desired signal s has a small amplitude (e.g., the desired signal s is quiet), the phase error has a value that is away from 0, thus reflecting the large delay δn. In an example, if the phase error is too far away from 0 (e.g., as determined based on a predetermined threshold or another criterion), then the phase error is considered to be equal to zero. In this example, the large phase error most likely reflects the large delay δn. On the other hand, when s has a large amplitude and is dominant (e.g., the desired signal s is larger than the noise n), the phase error has a value that is around 0, thus reflecting the small delay δs.

In another example, M1 and x are interchanged in the calculation of the phase error. Specifically, in the example framework above, where features of the approaches described with reference to FIGS. 6A-8 are used, amplitude values t3, t2, t1, and t1' are defined according to Equation 8. In the example where M1 and x are interchanged, these amplitude values are instead defined as follows:

$$t3 = \text{amplitude of adjusted combined signal } x \text{ at time } k,$$

$$t2 = \text{amplitude of first signal } M1 \text{ at time } k,$$

$$t1 = \text{amplitude of first signal } M1 \text{ at time } k+1, \text{ and}$$

$$t1' = \text{amplitude of first signal } M1 \text{ at time } k-1. \quad \text{(Equation 12)}$$

The determining of the phase error is otherwise consistent with the example framework described above (i.e., values p and p' are calculated according to Equations 9 and 10, respectively or set equal to the invalidity flag 1.1, and the expressions of Equation 11 are evaluated to determine the phase error).

Figure 9:
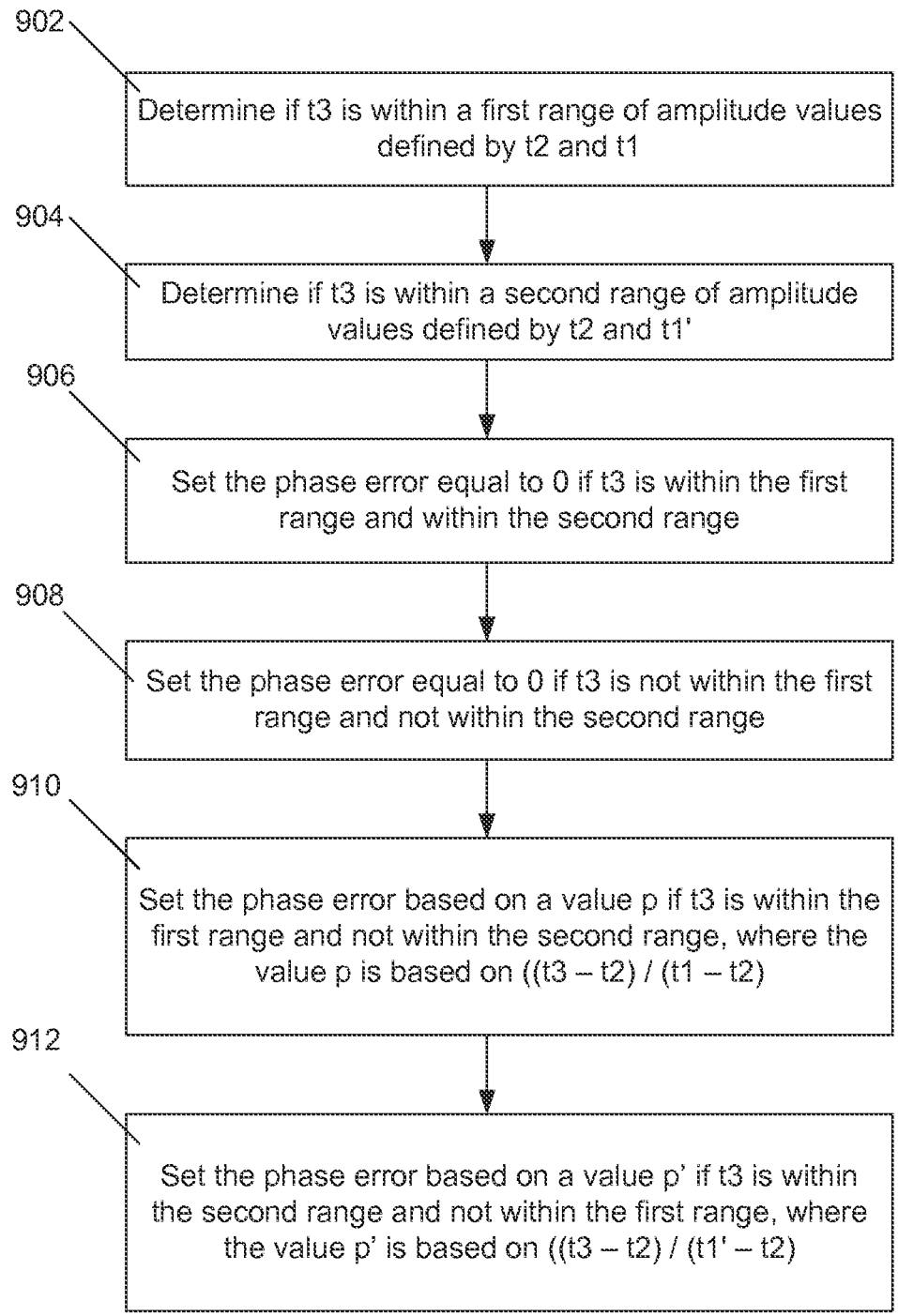
FIG. 9 is a flow diagram depicting an example method for determining a phase error between an adjusted combined signal x and a first signal M1.

FIG. 9 is a flow diagram depicting an example method for determining a phase error between an adjusted combined signal x and a first signal M1. As described above with reference to FIGS. 6A-8, in performing a phase adjustment on the adjusted combined signal x, (i) amplitude values of the adjusted combined signal x during a period of time and (ii) an amplitude value of the first signal M1 are considered. Specifically, the amplitude values of the adjusted combined signal x include a first amplitude value t1' at a first time, a second amplitude value t2 at a second time that is after the first time, and a third amplitude value t1 at a third time that is after the second time. The amplitude value t3 of the first signal M1 occurs at the second time. The performing of the phase adjustment of the adjusted combined signal x includes determining a phase error between the adjusted combined signal x and the first signal M1.

In an example, the determining of the phase error is performed according to the steps of FIG. 9. At 902, it is determined if the amplitude value t3 of the first signal M1 is within a first range of amplitude values defined by the second amplitude value t2 and the third amplitude value t1. At 904, it is determined if the amplitude value t3 of the first signal M1 is within a second range of amplitude values defined by the second amplitude value t2 and the first amplitude value t1'. At 906, the phase error is set equal to 0 if the amplitude value t3 of the first signal M1 is within the first range and is within the second range. At 908, the phase error is set equal to 0 if the amplitude value t3 of the first signal M1 is not within the first range and not within the second range. At 910, the phase error is set based on a value p if the amplitude value t3 of the first signal M1 is within the first range and not within the second range. The value p is determined using a linear approximation based on ((t3−t2)/(t1−t2)). At 912, the phase error is set based on a value p' if the amplitude value t3 of the first signal M1 is within the second range and not within the first range. The value p' is determined using a linear approximation based on ((t3−t2)/(t1'−t2)).

Figure 10A:
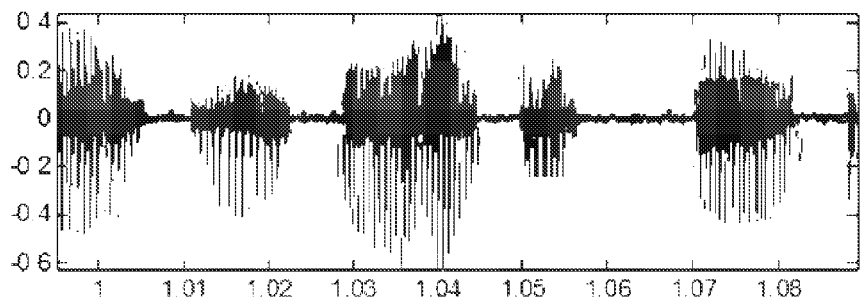
FIG. 10A is a graph depicting an amplitude of a desired signal s.
Figure 10B:
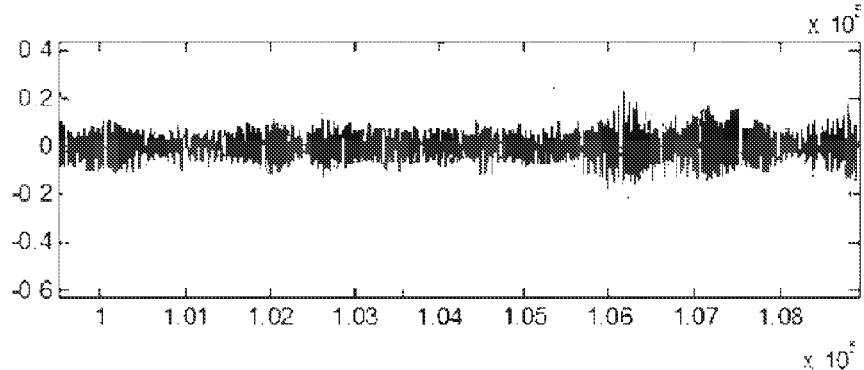
FIG. 10B is a graph depicting an amplitude of a noise signal n.

FIG. 10A is a graph depicting an amplitude of a desired signal s, and FIG. 10B is a graph depicting an amplitude of a noise signal n. As described above with reference to FIGS. 1 and 2, s represents a desired signal received at an antenna, and n represents a noise signal received at the antenna, such that the first signal M1 described throughout this disclosure is equal to (s+n). The x-axes of FIGS. 10A and 10B represent time. In an example, the desired signal s of FIG. 10A represents a person's speech that is on and off intermittently, and the noise signal n of FIG. 10B represents background noise (e.g., background noise in a restaurant that is received at a microphone of a mobile phone). As illustrated in FIGS. 10A and 10B, the desired signal s includes peaks and valleys, and during these valleys, the noise signal n may be temporarily louder than s.

Figure 10C:
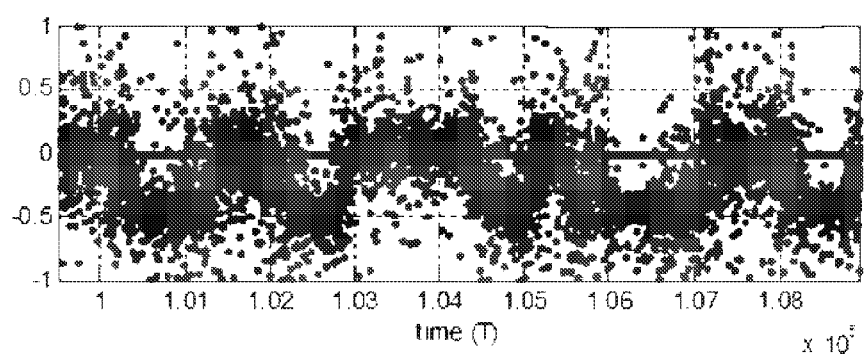
FIG. 10C is a graph depicting phase error values generated in performing noise filtering of a signal.

In processing the signals s and n of FIGS. 10A and 10B using the noise-filtering techniques described herein, phase error values are generated as part of a phase adjustment process. Example phase error values corresponding to the signals s and n of FIGS. 10A and 10B are depicted in FIG. 10C. Thus, in FIG. 10C, a y-axis represents a phase error value generated by an error generator (e.g., error generator 404 or error generator 504 of FIGS. 4 and 5, respectively), and an x-axis represents time. As illustrated in FIG. 10C, the phase error is always within the range −1 to 1. When the desired signal s is quiet, the phase error of FIG. 10C has a value that is away from 0, reflecting the large delay δn. When the desired signal s is dominant, the phase error is around 0, reflecting the small delay δs. As noted above, in an example, when the phase error deviates from 0 by too large a value (e.g., a predetermined threshold value), the phase error may be determined to reflect the large delay δn and may be set equal to 0.

Figure 11:
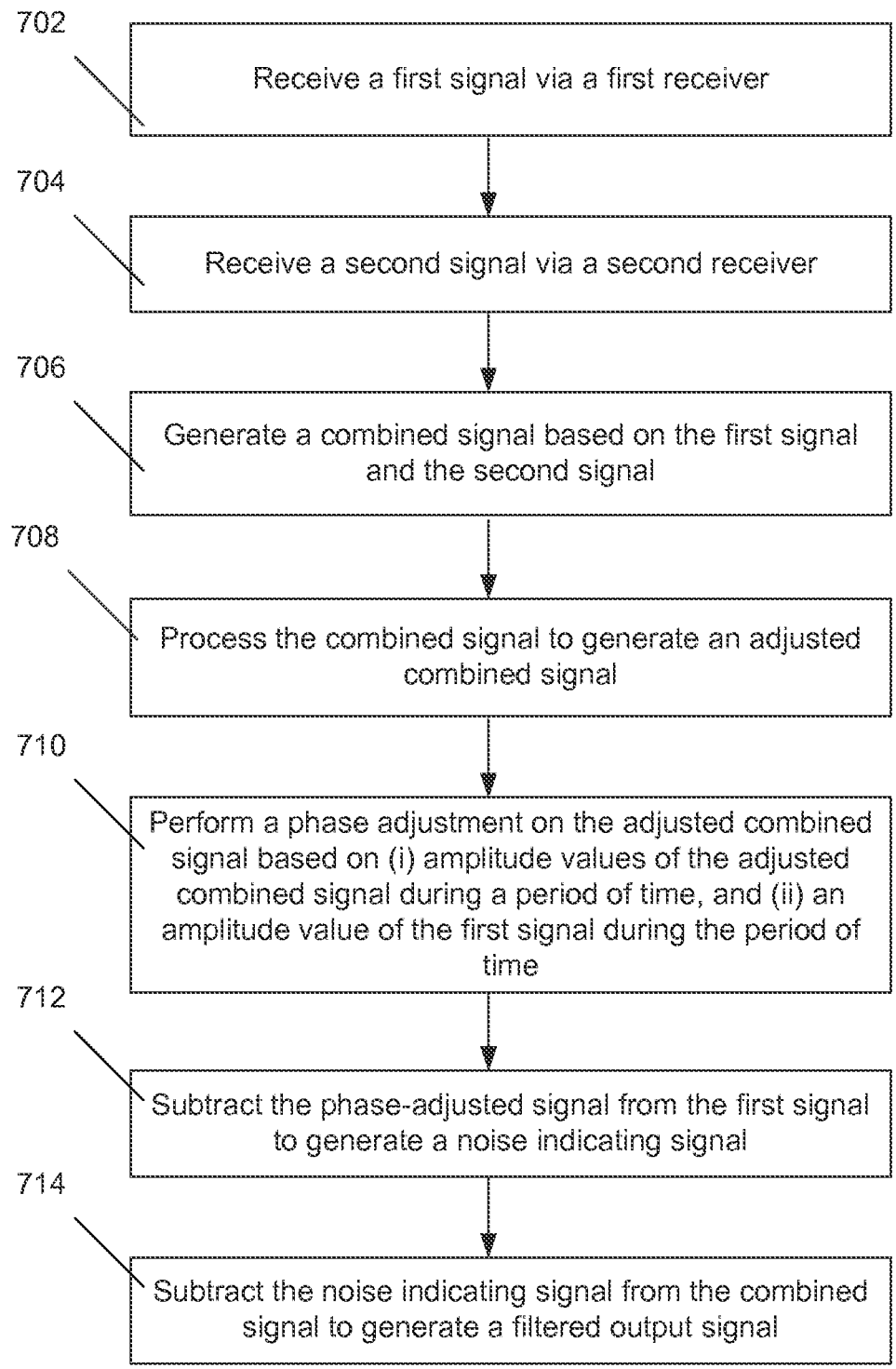
FIG. 11 is a flow diagram depicting a method of performing noise filtering of a received signal.

FIG. 11 is a flow diagram depicting a method of performing noise filtering of a received signal. At 702, a first signal is received via a first receiver. At 704, a second signal is received via a second receiver. Each of the first and second signals includes a desired signal portion and a noise portion, where the desired signal portions are received at the first receiver and the second receiver substantially simultaneously, and the noise portions are received at the first receiver and the second receiver at different times. At 706, a combined signal based on the first signal and the second signal is generated. At 708, the combined signal is processed to generate an adjusted combined signal. At 710, a phase adjustment is performed on the adjusted combined signal based on (i) amplitude values of the adjusted combined signal during a period of time, and (ii) an amplitude value of the first signal during the period of time. At 712, the phase-adjusted signal is subtracted from the first signal to generate a noise reference signal. The noise reference signal is a representation of the noise portion of the first signal. At 714, the noise reference signal is subtracted from the combined signal to generate a filtered output signal, the filtered output signal being substantially similar to the desired signal portions of the first and second signals.

Figure 12:
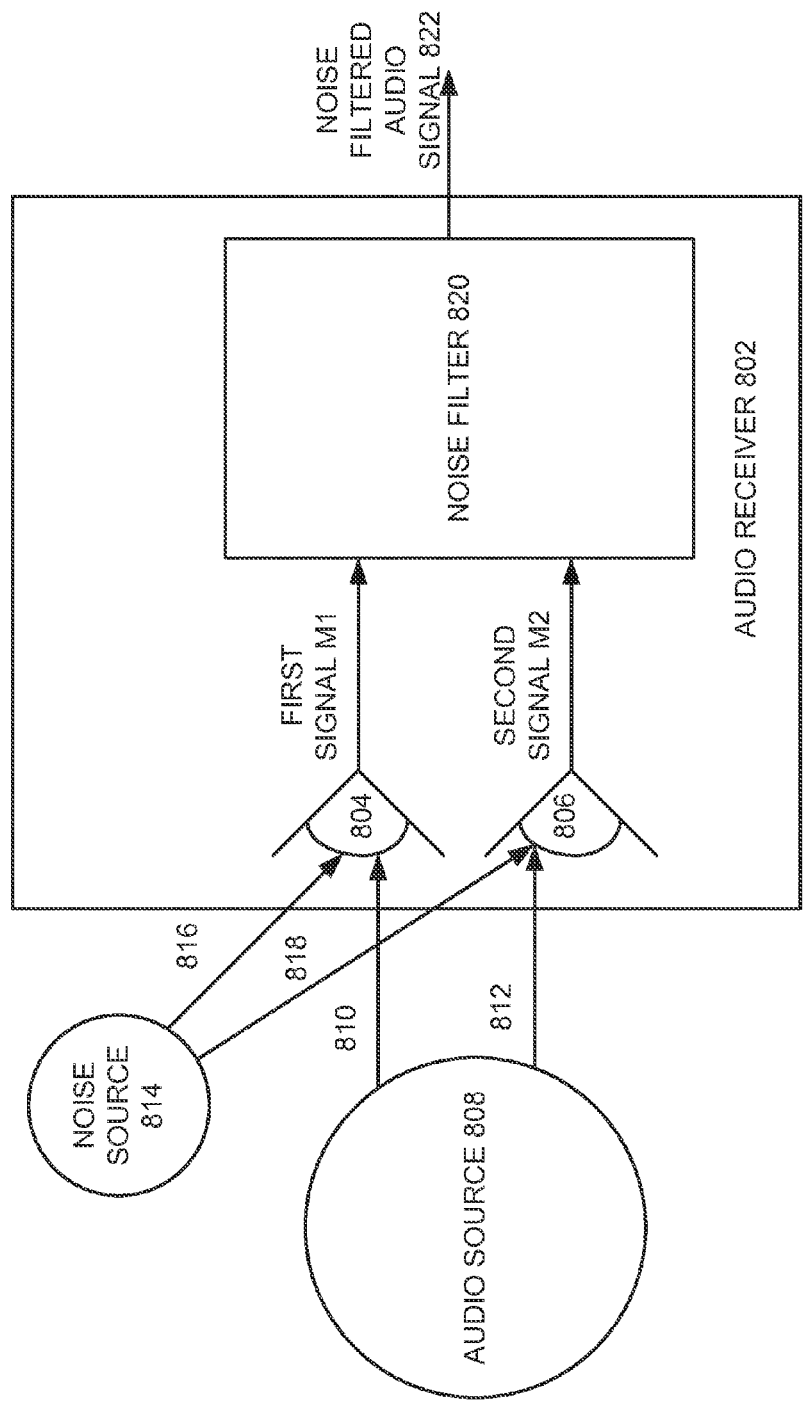
FIG. 12 is a diagram depicting the acquisition of a first signal M1 and a second signal M2 in an audio processing context.

The systems and methods described herein can be implemented in a variety of contexts. FIG. 12 is a diagram depicting the acquisition of a first signal M1 and a second signal M2 in an audio processing context, such as part of a cell phone microphone component. An audio receiver 802 includes a plurality of microphones 804, 806 configured to receive an audio signal from an audio source 808. The microphones 804, 806 are positioned orthogonally to a direction from which an incoming audio signal 810, 812 from the audio source 808 is expected to be received. Because the microphones 804, 806 are positioned orthogonally to the expected direction of travel of the incoming audio signal 810, 812, the incoming signal 810, 812 is received by the microphones 804, 806, respectively, at nearly the same time.

The communication channel through which the incoming audio signal 810, 812 is transmitted will often introduce a noise component from a noise source 814. For example, ambient noise from the noise source 814 is picked up by the microphones 804, 806. Because the noise source 814 is coming from a direction that is not orthogonal to the positioning of the microphones 804, 806, the microphones will receive the noise signals 816, 818 at different times. In the example of FIG. 13, the first microphone 804 receives the noise signal 816 before the second microphone 806 receives the noise signal 818 due to the longer distance between the noise source 814 and those respective microphones. A noise filter 820 is configured to utilize the time differentiation of the receipt of the noise signals 816, 818 to generate a noise filtered audio signal 822 that is as close as possible to the transmitted audio signal 810, 812.

The signal processing described above with reference to FIGS. 1-12 relates to processing of the first signal M1. It should be appreciated that in examples, the same signal processing algorithms are used in processing the second signal M2.

This application uses examples to illustrate the invention. The patentable scope of the invention includes other examples. For example, the incoming signal in other implementations may be a WiFi signal, a radio wave signal, a sonar signal, or any other electromagnetic signal.

It is claimed:

1. A system for performing noise filtering of a received signal, the system comprising:
   a first receiver configured to capture a first signal;
   a second receiver configured to capture a second signal, wherein each of the first and second signals includes a desired signal portion and a noise portion, the desired signal portions being received at the first receiver and the second receiver substantially simultaneously, and the noise portions being received at the first receiver and the second receiver at different times; and a signal processor configured to
generate a combined signal based on the first signal and the second signal,
process the combined signal to generate an adjusted combined signal, wherein amplitude values of the adjusted combined signal include (i) a first amplitude value of the adjusted combined signal at a first time, and (ii) a second amplitude value of the adjusted combined signal at a second time that is before or after the first time,
perform a phase adjustment on the adjusted combined signal, wherein performance of the phase adjustment includes determining a phase error between the adjusted combined signal and the first signal, and wherein determining of the phase error includes approximating using a linear approximation a difference between (i) the first time, and (ii) a time at which the adjusted combined signal has an amplitude value of the first signal, wherein the linear approximation is based on the first amplitude value, the second amplitude value, and the amplitude value of the first signal at the time at which the adjusted combined signal has the same amplitude value,
subtract the phase-adjusted signal from the first signal to generate a noise reference signal, the noise reference signal being a representation of the noise portion of the first signal, and
subtract the combined signal to generate a filtered output signal, the filtered output signal being substantially similar to the desired signal portions of the first and second signals.

2. The system of claim 1, wherein the difference is approximated based on $$p=(t3-t2)/(t1-t2),$$

where p is the approximated difference, t3 is the amplitude value of the first signal, t2 is the first amplitude value of the adjusted combined signal, and t1 is the second amplitude value of the adjusted combined signal.

3. The system of claim 2, wherein the phase error is equal to p normalized by a clock cycle T of the signal processor.

4. The system of claim 2, wherein the phase error is equal to a product of p and a clock cycle T of the signal processor.

5. The system of claim 1, wherein the signal processor is configured to perform the phase adjustment on the adjusted combined signal to match a desired signal portion of the adjusted combined signal with the desired signal portion of the first signal.

6. A system for performing noise filtering of a received signal, the system comprising:
a first receiver configured to capture a first signal;
a second receiver configured to capture a second signal, wherein each of the first and second signals includes a desired signal portion and a noise portion, the desired signal portions being received at the first receiver and the second receiver substantially simultaneously, and the noise portions being received at the first receiver and the second receiver at different times; and
a signal processor configured to
generate a combined signal based on the first signal and the second signal,
process the combined signal to generate an adjusted combined signal, wherein amplitude values of the adjusted combined signal include (i) a first amplitude value of the adjusted combined signal at a first time, (ii) a second amplitude value of the adjusted combined signal at a second time that is before or after the first time, and (iii) a third amplitude value of the adjusted combined signal at a third time that is after the second time, wherein the first, second, and third times occur within a period of time, and wherein an amplitude value of the first signal occurs at the second time,
perform a phase adjustment on the adjusted combined signal, wherein the performing of the phase adjustment of the adjusted combined signal includes determining a phase error between the adjusted combined signal and the first signal, the determining of the phase error including (i) determining if the amplitude value of the first signal is within a first range of amplitude values defined by the second amplitude value and the third amplitude value, and (ii) determining if the amplitude value of the first signal is within a second range of amplitude values defined by the second amplitude value and the first amplitude value,
subtract the phase-adjusted signal from the first signal to generate a noise reference signal, the noise reference signal being a representation of the noise on of the first signal, and
subtract the combined signal to generate a filtered output signal, the filtered output signal being substantially similar to the desired signal portions of the first and second signals.

7. The system of claim 6, wherein the determining of the phase error includes:
setting the phase error equal to zero if the amplitude value of the first signal is within the first range and within the second range;
setting the phase error equal to zero if the amplitude value of the first signal is not within the first range and not within the second range;
setting the phase error based on a value p if the amplitude value of the first signal is within the first range and not within the second range, wherein p is determined by approximating a first difference between (i) the second time, and (ii) a time at which the adjusted combined signal has the amplitude value of the first signal, and wherein the approximating of the first difference is based on the second amplitude value, the third amplitude value, and the amplitude value of the first signal; and
setting the phase error based on a value p' if the amplitude value of the first signal is within the second range and not within the first range, wherein p' is determined by approximating a second difference between (i) the second time, and (ii) the time at which the adjusted combined signal has the amplitude value of the first signal, and wherein the approximating of the second difference is based on the second amplitude value, the first amplitude value, and the amplitude value of the first signal.

8. The system of claim 7, wherein the value p is determined based on $$(t3-t2)/(t1-t2),$$

where t3 is the amplitude value of the first signal, t2 is the second amplitude value of the adjusted combined signal, and t1 is the third amplitude value of the adjusted combined signal; and
wherein the value p' is based on $$(t3-t2)/(t1'-t2),$$

where t1' is the first amplitude value of the adjusted combined signal.

9. The system of claim 1, wherein the signal processor is configured to continue to perform the phase adjustment on the adjusted combined signal based on amplitude values of the adjusted combined signal and the first signal via a feedback loop.

10. A method for performing noise filtering of a received signal, the method comprising:
receiving a first signal via a first receiver;
receiving a second signal via a second receiver, wherein each of the first and second signals includes a desired signal portion and a noise portion, the desired signal portions being received at the first receiver and the second receiver substantially simultaneously, and the noise portions being received at the first receiver and the second receiver at different times;
generating a combined signal based on the first signal and the second signal;
processing the combined signal to generate an adjusted combined signal, wherein amplitude values of the adjusted combined signal include (i) a first amplitude value of the adjusted combined signal at a first time, (ii) a second amplitude value of the adjusted combined signal at a second time that is after the first time, and (iii) a third amplitude value of the adjusted combined signal at a third time that is after the second time, wherein the first, second, and third times occur within a period of time, and wherein an amplitude value of the first signal occurs at the second time;
performing a phase adjustment on the adjusted combined signal, wherein the performing of the phase adjustment of the adjusted combined signal includes determining a phase error between the adjusted combined signal and the first signal, the determining of the phase error including (i) determining if the amplitude value of the first signal is within a first range of amplitude values defined by the second amplitude value and the third amplitude value, and (ii) determining if the amplitude value of the first signal is within a second range of amplitude values defined by the second amplitude value and the first amplitude value;
subtracting the phase-adjusted signal from the first signal to generate a noise reference signal, the noise reference signal being a representation of the noise portion of the first signal; and
subtracting the noise reference signal from the combined signal to generate a filtered output signal, the filtered output signal being substantially similar to the desired signal portions of the first and second signals.

11. The method of claim 10, wherein the determining of the phase error includes:
setting the phase error equal to zero if the amplitude value of the first signal is within the first range and within the second range;
setting the phase error equal to zero if the amplitude value of the first signal is not within the first range and not within the second range;
setting the phase error based on a value p if the amplitude value of the first signal is within the first range and not within the second range, wherein p is determined by approximating a first difference between (i) the second time, and (ii) a time at which the adjusted combined signal has the amplitude value of the first signal, and wherein the approximating of the first difference is based on the second amplitude value, the third amplitude value, and the amplitude value of the first signal; and
setting the phase error based on a value p' if the amplitude value of the first signal is within the second range and not within the first range, wherein p' is determined by approximating a second difference between (i) the second time, and (ii) the time at which the adjusted combined signal has the amplitude value of the first signal, and wherein the approximating of the second difference is based on the second amplitude value, the first amplitude value, and the amplitude value of the first signal.

12. The method of claim 11, wherein the value p is determined based on $(t3-t2)/(t1-t2)$, where t3 is the amplitude value of the first signal, t2 is the second amplitude value of the adjusted combined signal, and t1 is the third amplitude value of the adjusted combined signal; and
wherein the value p' is based on $(t3-t2)/(t1'-t2)$, where t1' is the first amplitude value of the adjusted combined signal.

13. A system for performing noise filtering of a received signal, comprising:
a first receiver configured to capture a first signal;
a second receiver configured to capture a second signal, wherein each of the first and second signals includes a desired signal portion and a noise portion, the desired signal portions being received at the first receiver and the second receiver substantially simultaneously, and the noise portions being received at the first receiver and the second receiver at different times;
an adder configured to combine the first signal and the second signal to form a combined signal;
a phase shifter configured to process the combined signal to generate an adjusted combined signal, wherein amplitude values of the adjusted combined signal include (i) a first amplitude value of the adjusted combined signal at a first time, (ii) a second amplitude value of the adjusted combined signal at a second time that is after the first time, and (iii) a third amplitude value of the adjusted combined signal at a third time that is after the second time, wherein the first, second, and third times occur within a period of time, and wherein an amplitude value of the first signal occurs at the second time;
a phase feedback loop configured to perform a phase adjustment to the adjusted combined signal, wherein the performing of the phase adjustment of the adjusted combined signal includes determining a phase error between the adjusted combined signal and the first signal, the determining of the phase error including (i) determining if the amplitude value of the first signal is within a first range of amplitude values defined by the second amplitude value and the third amplitude value, and (ii) determining if the amplitude value of the first signal is within a second range of amplitude values defined by the second amplitude value and the first amplitude value; and
a subtractor configured to subtract the phase-adjusted signal front the first signal to generate a noise reference signal that is subtracted from the combined signal to generate a filtered output signal, wherein the noise reference signal is a representation of the noise portion of the first signal, and wherein the filtered output signal is substantially similar to the desired signal portions of the first and second signals,
wherein the phase adjustment is continually regulated based on amplitude values of the adjusted combined signal and the first signal.

* * * * *